July 4, 1933.  G. E. EDMUNDS  1,916,784
MINE CAR BRAKE MECHANISM
Original Filed Sept. 19, 1929   3 Sheets-Sheet 1
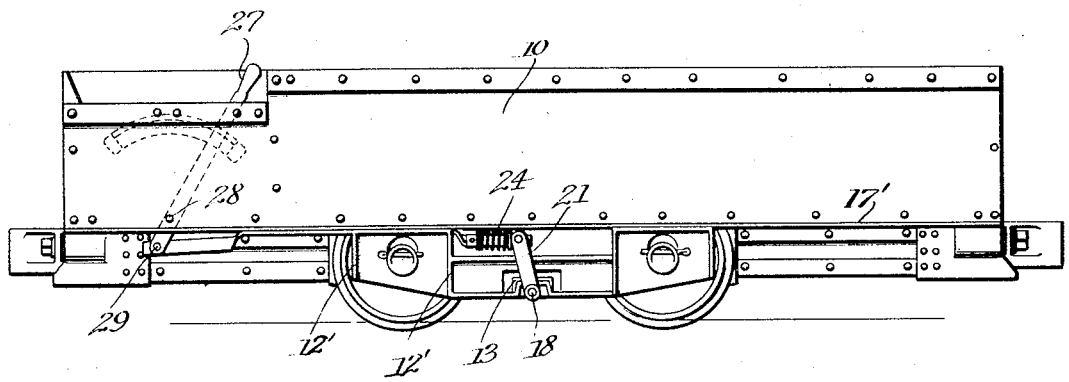
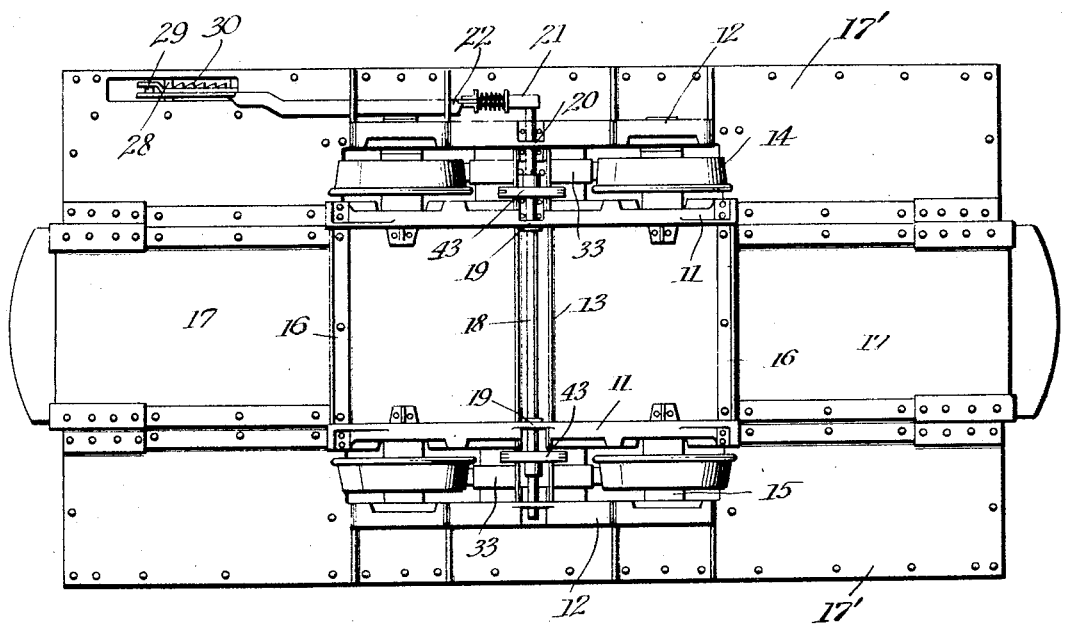
Inventor
Glenn E. Edmunds
Attorneys July 4, 1933.  G. E. EDMUNDS  1,916,784
MINE CAR BRAKE MECHANISM
Original Filed Sept. 19, 1929   3 Sheets-Sheet 2
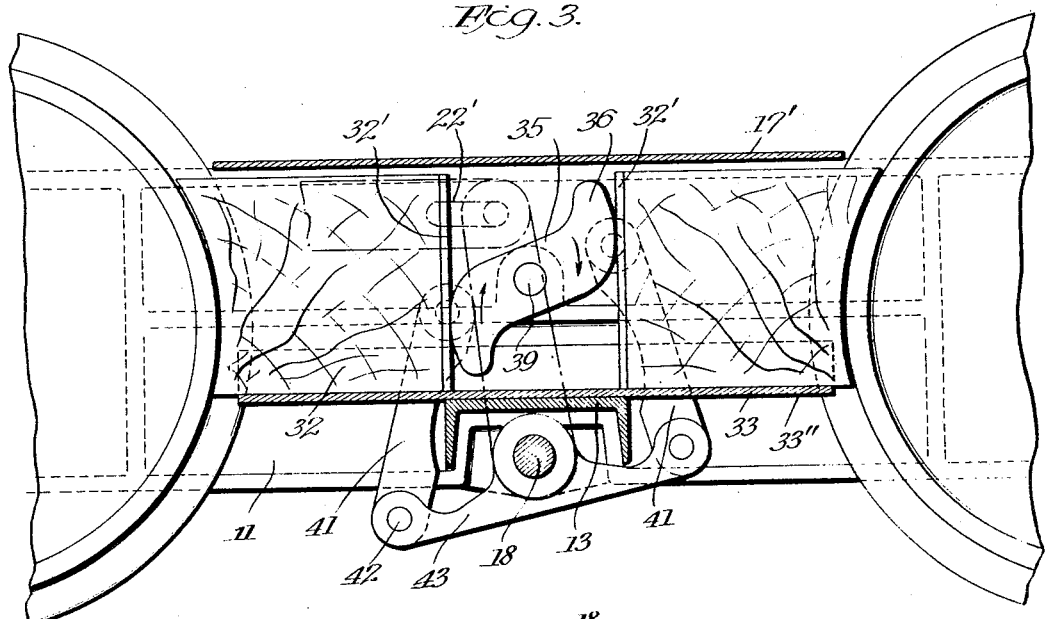
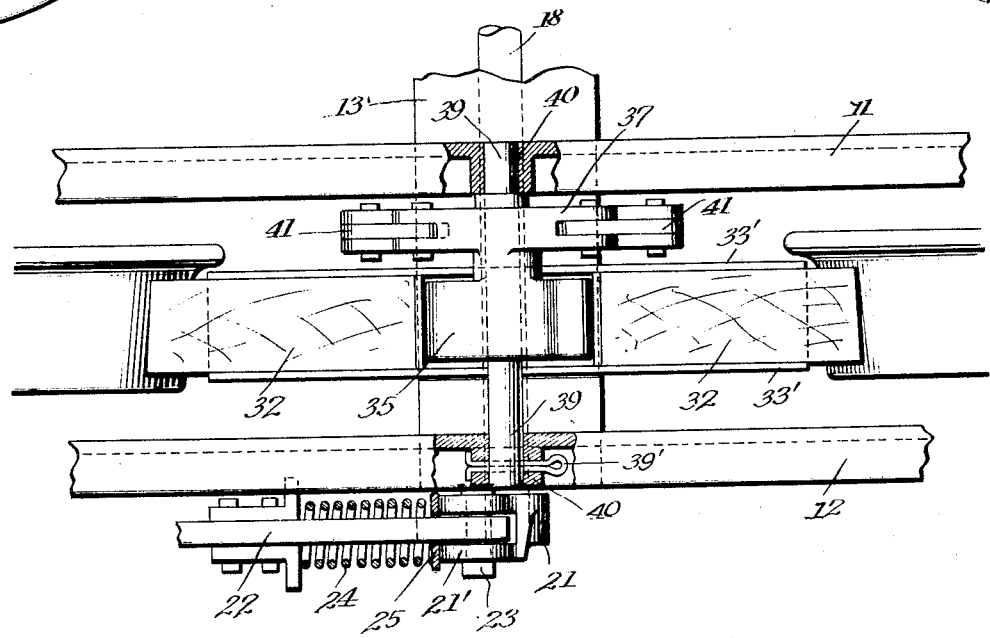
Inventor
Glenn E. Edmunds.
Attorney

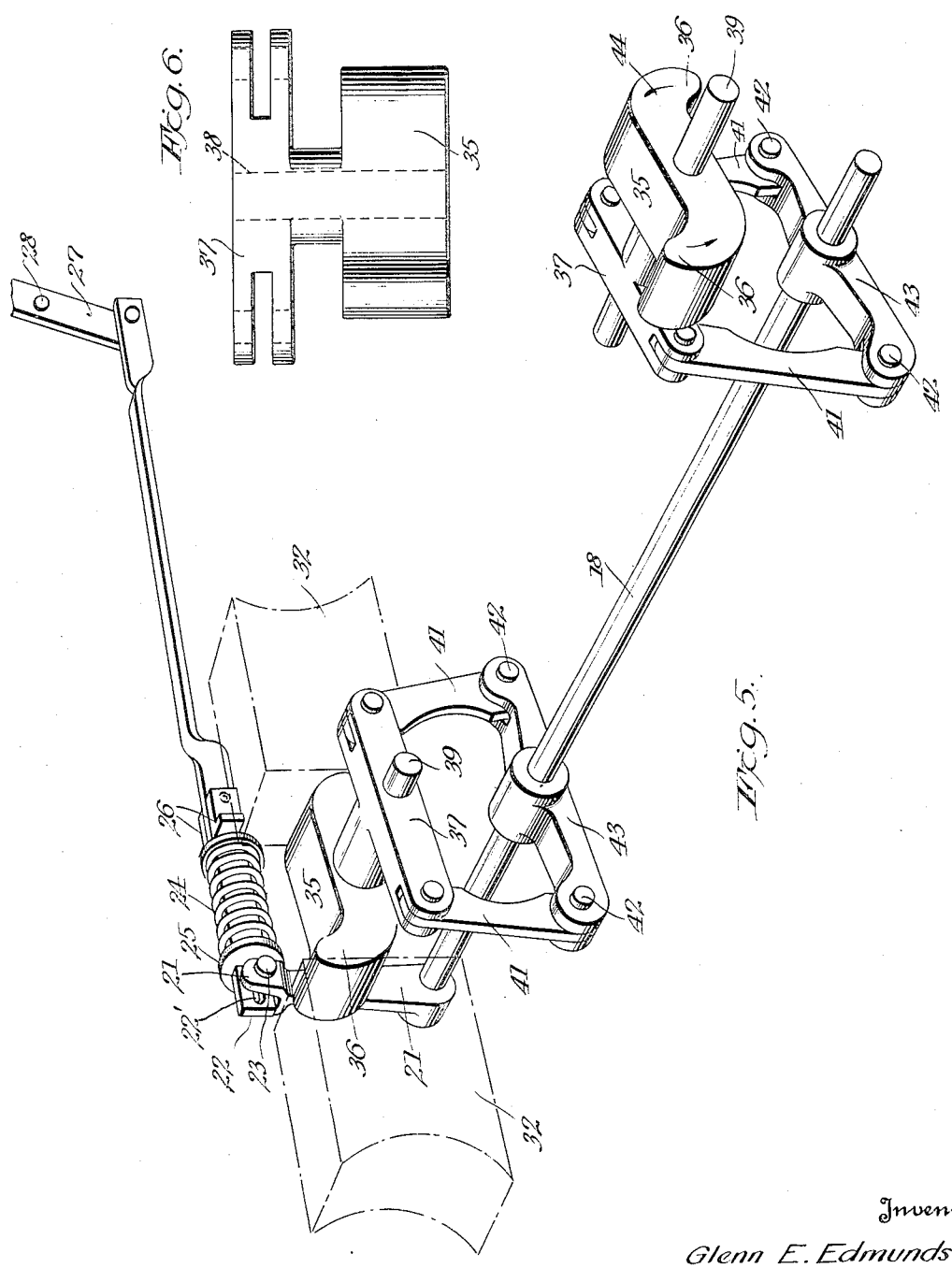

Patented July 4, 1933

1,916,784

UNITED STATES PATENT OFFICE

GLENN E. EDMUNDS, OF COLUMBUS, OHIO, ASSIGNOR TO THE BONNEY-FLOYD COMPANY, OF COLUMBUS, OHIO, A CORPORATION OF OHIO

MINE CAR BRAKE MECHANISM

Application filed September 19, 1929, Serial No. 393,764. Renewed June 4, 1932.

The present invention relates to cars, and more particularly to cars of the type used in mines and industrial plants.

The invention has as an object to provide for mine cars, or cars of a similar type, a brake mechanism which is of simple and durable construction, and which is positive in operation and adapted to be readily applied to a car.

A still further object of the invention is to provide a brake mechanism which is particularly adapted for use in a mine car of the type comprising a truck having at each side inner and outer longitudinally extending sill bars arranged with the wheels therebetween, the wheels being ordinarily on stub axles. The invention seeks to afford a brake mechanism which may be readily and quickly associated with a car of this type, so as to apply the brakes very effectively by manual power. Mine cars of this general type are shown, for instance, in my Patents 1,525,072, granted February 3, 1925; 1,644,009, 1,644,010 and 1,644,011, granted October 4, 1927; and 1,678,563, granted July 4, 1928.

The foregoing and other objects of the invention more closely related to details of construction will become clearer as the description proceeds in connection with a preferred embodiment of the invention, which is disclosed in the accompanying drawings, wherein:

Figure 1 is a side elevational view of a mine car having the brake mechanism applied thereto.

Figure 2 is a bottom plan view of the car shown in Figure 1.

Figure 3 is an elevational view with parts shown in section.

Figure 4 is a fragmentary plan view.

Figure 5 is a perspective of the brake applying mechanism removed from the car and showing the parts in the position they assume when the brakes are applied, and Figure 6 is a detail plan view of the cam means associated with the brake shoes for operating the same.

Referring to the drawings for a more detailed description, the brake mechanism is shown as applied to a car of the general type disclosed in my patents above mentioned, and for which the brake mechanism has been particularly designed, although, as will be understood, it is applicable to industrial or mine cars of various types.

The particular type of car illustrated comprises a body 10 mounted upon a truck unit, the latter having side sills or bars, arranged preferably in pairs, each pair having truck wheels disposed therebetween. In the drawings, 11 indicates the inner sill bar of each pair, and 12 the outer sill bar of each pair. These sill bars are connected by a bottom floor support in the form of an intermediate channel-beam cross-girt 13 extending through the inner sill bars 11, and secured to the outer sill bars between the wheels. The wheels 14 are mounted upon stub axles 15, which may be carried by the sill bars in any suitable manner, for instance, as shown in my Patent 1,644,012, granted October 4, 1927, or as disclosed in my Patent 1,708,608, granted April 9, 1929. Adjacent their ends, the inner sill bars 11 may be connected by cross-girts 16 which serve to support the floor 17 of the car body. As here shown, the car floor comprises flare plates 17′ above the level of the central floor 17 and above the plane of the wheel axes.

Referring to the brake mechanism, to which the present invention relates, the same comprises a rock shaft 18 having bearings 19 in the inner sill bars, and bearings 20 in the outer sill bars. At one side the rock shaft is extended and has affixed thereto an upwardly directed lever arm 21 provided with a fork end 21′, the fingers of which receive therebetween the ends of a link 22 which is pivotally connected to the lever arm 21 by pin 23 extending through a slot 22′ (Fig. 3) elongated longitudinally of the link 22. The link is normally maintained with the pin at the end of the slot which is adjacent the end of the link, as shown in Fig. 3, by means of a spring 24 surrounding the link, and bearing against an abutment disc 25 slidable freely on the link and engaging the end of the lever arm 21 and against angle brackets 26 secured to the link.

The link extends from the lever arm lengthwise of the car through the reinforcing webs 12' of the outer sill bar 12 which is of the same general type shown in my Patent 1,678,563, the webs serving to support and guide the link as it is reciprocated for the purpose of rocking the shaft 18. The link is operated by means of a manually engageable lever 27 fulcrumed at 28 (Fig. 1) to the car side walls and pivotally connected at 29 to the end of the link 22. The lever may be retained in any adjusted position by segment 30, from which the lever may be disengaged by slight lateral movement which is permitted, as by play at the fulcrum 28. As will be understood from the foregoing description, the brake mechanism proper is operated from the manually engageable lever 27 through link 22 and rock shaft 18.

Referring to the brake mechanism proper, the same comprises a pair of shoes 32, supported and guided for reciprocatory movement in opposite directions by means of a channel member 33 extending longitudinally of the truck, and mounted directly upon the cross-girt 13 between the sill bars. The shoes may be of wood or other suitable material having a backing plate 32' adapted to be engaged by a suitable operating member which presses the brake shoe towards the wheels. As will be observed (Fig. 4) the shoes fit snugly between the side walls 33' of the guiding member 33, and are supported for sliding movement upon the bottom 33" thereof. Preferably, and as shown, there will be a pair of brake shoes at each side of the car. Means are necessarily provided for limiting upward displacement of the shoes and as here shown, Figure 3, such means are constituted by the flare plates 17' whose lower surfaces are immediately above the top surfaces of the shoes. The flare plates in conjunction with the channel members 33 thus complete the guiding means for the brake shoes. The shoes are readily replaceable upon removal of the car wheels.

For actuating the brake shoes, there is provided a cam member 35 having reversely directed cam arms 36 disposed between the blocks 32 within the guide element or housing 33. The cam means is best illustrated in Figure 6, and, as will be observed, has externally of the housing laterally extending forked arms 37 and a central bore 38 receiving a small shaft 39, on which the cam member turns freely. The small shaft 39 is mounted in bosses 40 on the sill bars 11 and 12, and may be held from longitudinal movement in any suitable manner, as, for example, and as here shown, by means of a cotter pin 39' which pins the shaft to the boss 40 on the outer sill 12. Each of the arms 37 is connected by link 41 through pivot connection 42 at the end of the cross head 43 fixed to the rock shaft 18.

As will be understood, rocking movement of the shaft 18, to apply the brakes, will turn the cam members 36 in the direction of the arrows 44, thus pressing the brake shoes apart against the wheels. Upon movement of the lever in the reverse direction, the pressure against the blocks will be relieved, and the wheels freed of friction, due to pressure of the brake shoes thereagainst.

The mechanism may be readily applied to a car of any type, and is particularly applicable to a car of the type shown in my patents above mentioned.

Obviously, numerous modifications may be made in the structure previously described without departing from my invention, which is defined in the following claims.

I claim:—

1. A mine car brake mechanism comprising a brake shoe housing, a pair of oppositely movable shoes in said housing adapted to be supported by the housing and guided thereby in their movement, cam means operative to move said shoes in opposite directions, a rock shaft adjacent said cam means, the rock shaft and cam means being independently mounted, means for rocking said shaft, and linkage connecting said shaft and the cam means whereby rocking movement of the shaft is transmitted to the cam for moving the shoes in opposite directions.

2. A mine car brake mechanism comprising a brake shoe housing, a pair of oppositely movable reciprocable shoes in said housing adapted to be supported by the housing and guided thereby in their movement, cam means operative to move said shoes in opposite directions and having an axis of rocking movement, a rock shaft having an axis of rocking movement independent of the axis of said cam means, means for rocking said shaft, and linkage connecting said shaft and the cam means whereby rocking movement of the shaft is transmitted to the cam for moving the shoes in opposite directions.

3. A mine car brake mechanism comprising a brake shoe housing, a pair of oppositely movable shoes in said housing adapted to be supported by the housing and guided thereby in their movement, cam means operative to move said shoes in opposite directions and disposed in the housing between said shoes, a rock shaft adjacent said cam means, the rock shaft and cam means being independently mounted, means for rocking said shaft, and linkage connecting said shaft and the cam means whereby rocking movement of the shaft is transmitted to the cam for moving the shoes in opposite directions.

4. A mine car brake mechanism comprising a brake shoe housing, a pair of oppositely movable reciprocable shoes in said housing adapted to be supported by the housing and guided thereby in their movement, cam means operative to move said shoes in opposite directions and disposed in the housing between said shoes, a rock shaft extending transversely of the car, the rock shaft and cam means being independently mounted and being disposed adjacent one another, means for rocking said shaft, and linkage connecting said shaft and the cam means whereby rocking movement of the shaft is transmitted to the cam for moving the shoes in opposite directions.

5. A mine car brake mechanism comprising a brake shoe housing, a pair of oppositely movable shoes in said housing adapted to be supported by the housing and guided thereby in their movement, cam means operative to move said shoes in opposite directions, a rock shaft, means for rocking said shaft, linkage connecting said shaft and the cam means whereby rocking movement of the shaft is transmitted to the cam for moving the shoes in opposite directions, said connection between the rock shaft and cam comprising a cross head on the shaft, links connected to opposite ends of the cross head, laterally extending arms on said cam means, and means connecting the links with said arms.

6. A mine car brake mechanism comprising a brake shoe housing, a pair of oppositely movable shoes in said housing adapted to be supported by the housing and guided thereby in their movement, cam means operative to move said shoes in opposite directions and disposed in the housing between said shoes, a rock shaft, means for rocking said shaft, linkage connecting said shaft and the cam means whereby rocking movement of the shaft is transmitted to the cam for moving the shoes in opposite directions, said connection between the rock shaft and cam comprising a cross head on the shaft, links connected to opposite ends of the cross head, laterally extending arms on said cam means, and means connecting the links with said arms.

7. A mine car brake mechanism comprising a brake shoe housing, a pair of oppositely movable reciprocable shoes in said housing adapted to be supported by the housing and guided thereby in their movement, cam means operative to move said shoes in opposite directions and disposed in the housing between said shoes, a rock shaft, means for rocking said shaft, and linkage connecting said shaft and the cam means whereby rocking movement of the shaft is transmitted to the cam for moving the shoes in opposite directions, said connection between the rock shaft and cam comprising a cross head on the shaft, links connected to opposite ends of the cross head, laterally extending arms on said cam means, and means connecting the links with said arms.

8. In a mine car of the type comprising a truck frame having at each side a pair of longitudinally extending spaced side sills with wheels positioned therebetween, and a cross member extending between the members of the pairs of sills, a brake shoe housing supported between one of the pair of sills, a rock shaft extending transversely of the truck, means for rocking said shaft, a pair of brake shoes in said housing movable in opposite directions, cam means for moving the brake shoes, and a connection between said rock shaft and said cam means whereby to operate the cam means to move the shoes from said rock shaft.

9. In a mine car of the type comprising a truck frame having at each side a pair of longitudinally extending spaced side sills with wheels positioned therebetween, and a cross member extending between the members of one pair of sills, a brake shoe housing supported between two of the sills on said cross member, a rock shaft extending transversely of the truck, means for rocking said shaft, a pair of brake shoes in said housing movable in opposite directions, cam means for moving the brake shoes, and a connection between said rock shaft and said cam means whereby to operate the cam means to move the shoes from said rock shaft.

10. In a mine car of the type comprising a truck frame having at each side a plurality of longitudinally extending side sills with wheels positioned therebetween, a brake shoe housing supported between two of the sills at one side, a rock shaft extending transversely of the truck beneath said housing, means for rocking said shaft, a pair of brake shoes in said housing movable in opposite directions, cam means for moving the brake shoes, and a connection between said rock shaft and said cam means whereby to operate the cam means to move the shoes from said rock shaft.

11. In a mine car of the type comprising a truck frame having at each side a plurality of longitudinally extending side sills with wheels positioned therebetween, a brake shoe housing supported between the two sills at one side, a rock shaft extending transversely of the truck, means for rocking said shaft, a pair of brake shoes in said housing movable in opposite directions, cam means for moving the brake shoes and disposed in the housing between said shoes, and a connection between said rock shaft and said cam means whereby to operate the cam means to move the shoes from said rock shaft.

12. In a mine car of the type comprising a truck frame having at each side a plurality of longitudinally extending side sills with wheels positioned therebetween, and a cross member extending entirely across the truck and beneath all the sills, a brake shoe housing supported between two of the sills at one side and supported on said cross member, a rock shaft extending transversely of the truck beneath said housing, means for rocking said shaft, a pair of brake shoes in said housing movable in opposite directions, cam means for moving the brake shoes and disposed in the housing between said shoes, and a connection between said rock shaft and said cam means whereby to operate the cam means to move the shoes from said rock shaft.

13. In a mine car of the type comprising a truck frame having at each side a plurality of longitudinally extending side sills with wheels positioned therebetween, a brake shoe housing supported between the two sills at one side, a rock shaft extending transversely of the truck beneath said housing, means for rocking said shaft, a pair of brake shoes in said housing movable in opposite directions, cam means for moving the brake shoes, and a connection between said rock shaft and said cam means whereby to operate the cam means to move the shoes from said rock shaft, said connection comprising a cross head on said rock shaft, links connected to opposite ends of said cross head, laterally extending arms on said cam means, and means connecting said links to said arms.

14. In a mine car of the type comprising a truck frame having at each side a plurality of longitudinally extending side sills with wheels positioned therebetween, a brake shoe housing supported between the two sills at one side, a rock shaft extending transversely of the truck, means for rocking said shaft, a pair of brake shoes in said housing movable in opposite directions, cam means for moving the brake shoes and disposed in the housing between said shoes, a connection between said rock shaft and said cam means whereby to operate the cam means to move the shoes from said rock shaft, said connection comprising a cross head on said rock shaft, links connected to opposite ends of said cross head, laterally extending arms on said cam means, and means connecting said links to said arms.

15. In a mine car of the type comprising a truck frame having at each side a plurality of longitudinally extending side sills with wheels positioned therebetween, and a cross member extending between the members of the pairs of sills, a brake shoe housing supported between the two sills at one side on said cross member, a rock shaft extending transversely of the truck beneath said housing, means for rocking said shaft, a pair of brake shoes in said housing movable in opposite directions, cam means for moving the brake shoes and disposed in the housing between said shoes, and a connection between said rock shaft and said cam means whereby to operate the cam means to move the shoes from said rock shaft, said connection comprising a cross head on said rock shaft, links connected to opposite ends of said cross head, laterally extending arms on said cam means, and means connecting said links to said arms.

16. Mine car brake mechanism comprising a pair of oppositely movable shoes in end to end relation, a horizontally extending channel bar supporting and guiding said shoes for sliding movements, a horizontal shaft extending between the shoes, upwardly and downwardly extending cams on said shaft, and means operable to rock the shaft whereby the shoes are oppositely moved by the cams.

17. In a mine car comprising a pair of parallel sill bars, a pair of wheels supported between said bars in fore and aft relation, a channel member disposed between said bars and extending substantially from wheel to wheel, brake shoes supported on said channel member for guided sliding movement thereon, a rock shaft extending transversely between the sill bars and between said shoes, cams on said rock shaft, and means operable to rock said shaft whereby the shoes are oppositely moved by the cams to engage said wheels.

18. In a mine car comprising a pair of parallel sill bars, a pair of wheels supported between said bars in fore and aft relation, a cross member extending beneath the sill bars and secured thereto, a channel member secured on said cross member and extending substantially from wheel to wheel, brake shoes supported on said channel member for guided sliding movements thereon, a rock shaft extending transversely between the sill bars and between said shoes, cams on said rock shaft, and means operable to rock said shaft whereby the shoes are oppositely moved by the cams to engage said wheels.

19. In a mine car, a pair of wheels mounted in fore and aft relation, a pair of oppositely movable brake shoes in end to end relation between said wheels, supporting means for the shoes on which the same are slidable toward and away from said wheels, a floor portion above said shoes limiting their upward displacement, and means for oppositely moving the shoes to engage them with said wheel.

20. In a mine car, a body comprising a central floor portion and a flare plate above the level of said central floor portion, a pair of supporting wheels mounted in fore and aft relation beneath said flare plate, a channel member supported below said flare plate and extending substantially from wheel to wheel, and oppositely movable brake shoes slidably supported and guided between said channel member and said flare plate.

21. In a mine car, a body comprising a central floor portion and a flare plate above the level of said central floor portion, a pair of supporting wheels mounted in fore and aft relation beneath said flare plate, a channel member extending substantially from wheel to wheel below said flare plate, a transverse member extending beneath said central floor portion and channel member and supporting the latter, and oppositely movable brake shoes slidably supported and guided between said channel member and said flare plate.

22. In a mine car, a body comprising a central floor portion and a flare plate above the level of said central floor portion, a pair of parallel sill bars extending longitudinally of the body beneath said flare plate, a pair of supporting wheels mounted in fore and aft relation beneath said flare plate, a channel member extending substantially from wheel to wheel below said flare plate and between said sill bars, a transverse member extending beneath said central floor portion and across said sill bars and supporting said channel member, and oppositely movable brake shoes slidably supported and guided between said channel member and said flare plate.

In testimony whereof I have hereunto set my hand.

GLENN E. EDMUNDS.